March 2, 1971     D. R. PLUMMER     3,567,317

CAMERA SYSTEMS

Filed May 17, 1968     2 Sheets-Sheet 1

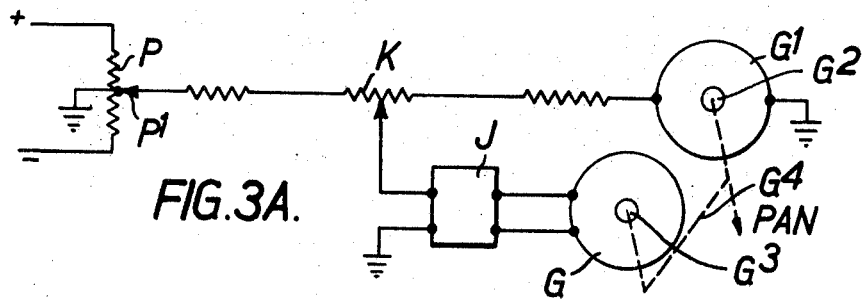
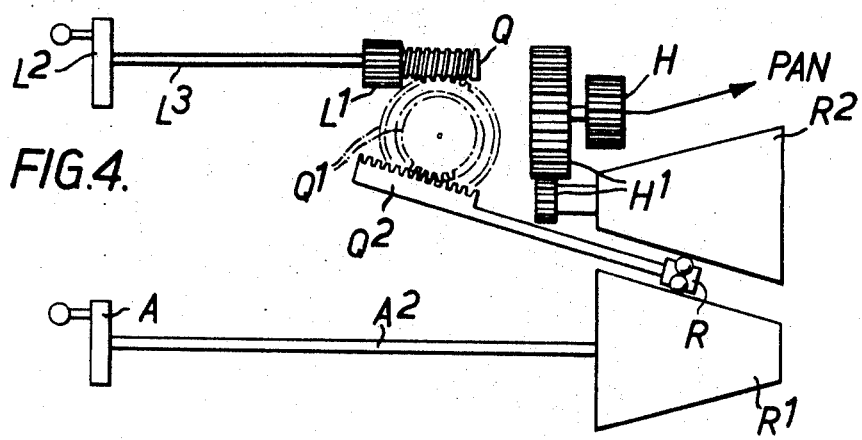
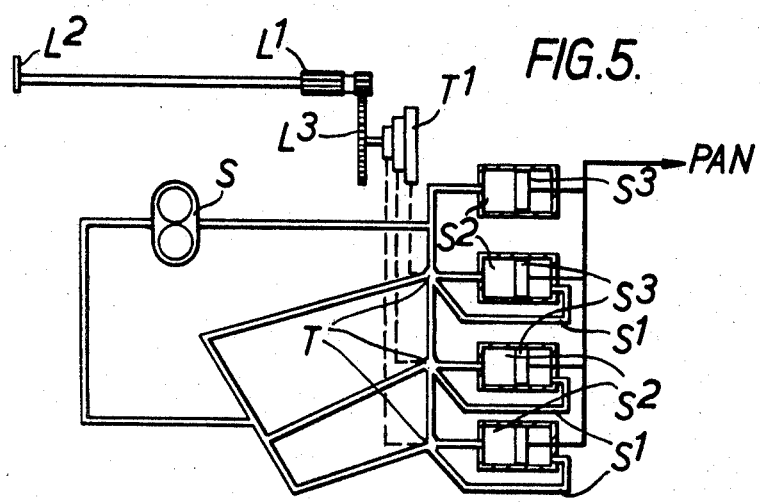

U̇nited States Patent Office 3,567,317
Patented Mar. 2, 1971

3,567,317
CAMERA SYSTEMS
Dexter Robert Plummer, Leicester, England, assignor to The Rank Organisation Limited, London, England
Filed May 17, 1968, Ser. No. 729,976
Claims priority, application Great Britain, May 18, 1967, 23,252/67
Int. Cl. G03b 3/10
U.S. Cl. 352—139    19 Claims

ABSTRACT OF THE DISCLOSURE

In a television motion picture camera system in which the camera has a zoom objective, a substantially constant portion of the field of view within the camera is traversed for a given demand from a demand unit, during angular movement of the camera, irrespective of the magnification of the camera-objective combination. This is achieved by making the angular drive of the camera variable and sensitive to the magnification of the camera-objective combination.

---

Figure 1:
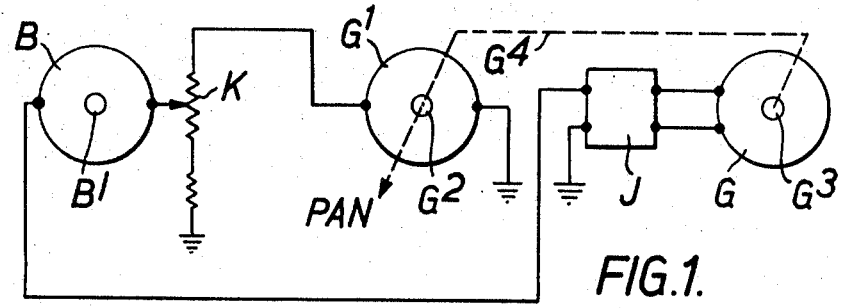

This invention relates to the control of a television or motion picture camera having a zoom optical objective of the kind having members relatively movable under the control of a zoom demand element for effecting continuous variation of the focal length of the objective throughout a range.

According to one aspect of the present invention a television or motion picture camera system comprises a camera having a zoom objective providing a continuous variation of focal length throughout a range and which is coupled to a driving unit arranged to provide directional movement of the camera, variable transmission means sensitive to the magnification of the camera objective combination and effective to move the driving unit in response to a signal from a demand unit and at a transmission ratio which is a function of this magnification, whereby a substantially constant portion of a picture image within the camera is traversed for a given demand irrespective of zoom setting.

According to a further aspect of the present invention a television or motion picture camera system comprises a camera which has a zoom objective providing continuous variation of the focal length throughout a range and which is coupled to a driving unit arranged to provide directional movement of the camera, variable transmission means sensitive to the focal length setting of the zoom objective and effective to move the driving unit in response to a signal from a demand unit and at a transmission ratio which is a function of the focal length setting whereby a substantially constant portion of the picture image within the camera is transversed for a given demand irrespective of zoom setting.

In the usual camera systems, two driving units respectively are arranged angularly to move the camera in a vertical and in a horizontal plane to produce tilting and panning.

The invention is usable in power assisted systems. The demand unit may be arranged to produce variable output by varying the gain of the servo system. Any combination of hydraulic, mechanical or electrical systems can be used, for example in a sophisticated system all the high power drives are likely to be hydraulic, whereas the low power drives are likely to be electrical.

Conveniently the variable transmission means include a variable impedance element coupled to the zoom actuating mechanism of the camera and effective directly or indirectly to modify the power input to the driving unit as a function of the focal length setting of the zoom objective.

Conveniently the demand unit is a rate responsive device and the driving unit comprises a reversible motor which is coupled to a further rate responsive device and which is driven from a source responsive to the difference between the outputs of the devices so that the motor rotates with the demand unit. In this case the variable impedance element coupled to the zoom actuating mechanism of the camera is effective to modify the outputs from either of the rate responsive devices. In the case where the rate responsive devices are for example excited tachometer generators the variable impedance element may be used to modify the excitation of one or more of these devices as a function of the focal length setting of the zoom objective. Alternatively, in the case where the tachometer generators are not separately excited, the variable impedance elements may merely modify the outputs of the tachometer generators.

Conveniently the variable impedance element may be a potentiometer having a wiper coupled to move with the zoom actuating mechanism of the objective.

In an alternative embodiment of the invention, the zoom demand is produced in a manually operated hand wheel mechanically coupled to the camera driving unit by way of a variable ratio gear box which is coupled to the zoom actuating mechanism to provide a transmission ratio which is a function of the focal length setting of the zoom objective.

The variable ratio gear box conveniently comprises two cones which are oppositely mounted for rotation with their conical surfaces adjacent and parallel and which respectively are coupled to the demand unit and to the driving unit, power being transmitted between the cones by means coupled to the zoom actuating mechanism and arranged to move along the length of the conical surfaces to produce variable transmission.

In a yet further alternative embodiment the driving unit is hydraulically powered by way of a fluid pressure device whose transmission ratio is varied as a function of the focal length setting of the zoom objective.

The driving unit producing directional movement of the camera may also be powered by a series of pulses derived from a source controlled by the demand unit and producing a pulse repetition rate which is a function of the zoom setting of the objective so that the rate of operation of the demand unit is dependent upon the zoom setting of the objective as well as the demand.

With the arrangement of the invention, the apparent sensitivity of the panning and tilting driving units may be maintained substantially constant throughout the range of variation of focal length of the objective or the magnification of the camera-objective combination. It will be appreciated that variable magnification can be obtained by varying the effective focal length of the zoom objective and/or by varying the effective magnification in the camera output where the camera is a television camera.

The embodiments of the invention will now be described by way of example with reference to the accompanying drawings.

Referring firstly to FIG. 1, this shows a control system used for producing panning of a television camera including a zoom objective. While the control system shown is described only with reference to panning it will be appreciated that a similar or identical system can be used for tilting or indeed for any other angular movement of the camera or part of the camera should this be required.

Referring to FIG. 1, the panning demand element is in the form of a hand wheel which is coupled through gearing to the input shaft $B^1$ of a tacho-generator B to drive such tacho-generator at a considerably faster speed than the speed of the hand wheel. This tacho-generator B and the associated gearing may conveniently be accommodated in a small housing on the side of the camera at its rear end. The gearing may of course be arranged in various ways other than that shown and may if desired be replaced by a friction drive.

The output of the tacho-generator B, which is proportional in sense and magnitude to the sense and speed of movement of the hand wheel A, is fed to an electrical servo-device contained in a small housing. The servo-device comprises a reversible electric motor G producing panning and a second tacho-generator $G^1$ having an input shaft $G^2$ rigid with the output shaft $G^3$ of the motor, the motor output being taken from this shaft through reduction gearing so as to pan the camera.

The servo-device also includes a high gain multi-stage amplifier J to which is applied not only the output voltage of the first tacho-generator B driven by the hand wheel A, but also a voltage derived from the output voltage of the second tacho-generator $G^1$ driven by the motor G. As also shown in FIG. 1, the output of the second tacho-generator $G^1$ is fed back to the amplifier J, in opposition to the input voltage due to the first tacho-generator B, through a potentiometer K controlled by the zoom actuating element (not shown), either through a direct mechanical linkage or through a linkage via the zoom control mechanism. Thus, the second input voltage to the amplifier J is constituted by the output voltage of the second tacho-generator $G^1$ attenuated by the potentiometer K, the degree of attenuation depending on the position of the zoom actuating element and thus on the focal length of the objective.

Since the potentiometer K is driven from the zoom actuating element it will be apparent that at maximum focal length of the zoom objective, the output voltage of the second tacho-generator $G^1$ has maximum effect, and progressively at reduced focal lengths, increasingly less effect. This has the result that, for a given amount of rotation of the hand wheel A, only a small panning movement occurs at maximum focal length for a given demand and such movement increases progressively towards the end of the range of zoom corresponding to minimum focal length.

Figure 2:
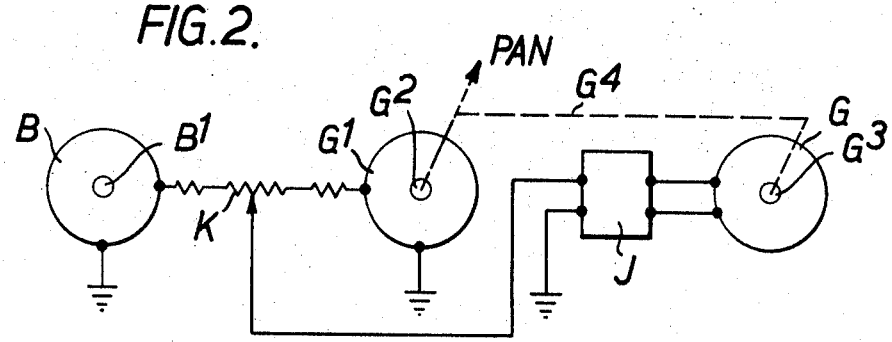
Figure 3:
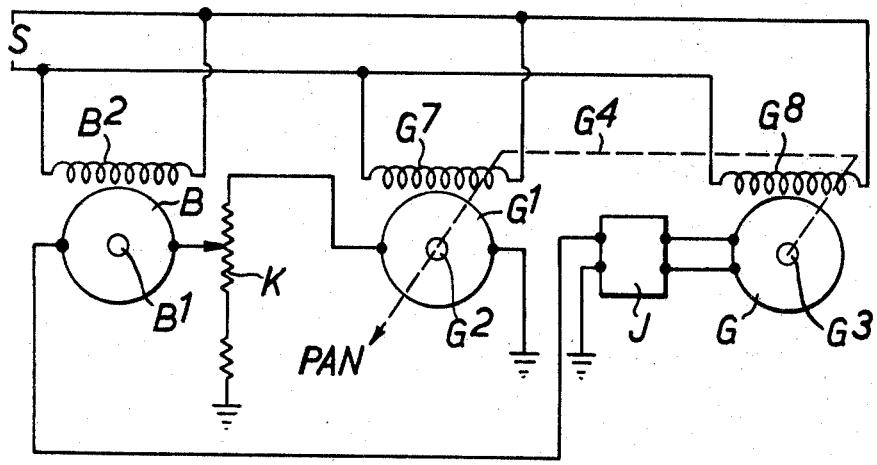

Accordingly, irrespective of the zoom setting of the objective, the same proportion of the image in the camera is transversed for a given pan demand signal at the hand wheel A so that the panning sensitivity of the camera to a given demand remains substantially constant. It will also be apparent for obvious reasons that this result has obvious advantages to the operator who has to make a variety of control corrections during camera control and whose task will be rendered exceedingly more difficult if the sensitivity of all the correction parameters varied during the course of the operation. It will be apparent that the potentiometer K may alternatively be used as a potential divider acting to vary the attenuation of the output voltages of the tacho-generators B and $G^1$ as shown in FIG. 2. It is also practicable to incorporate such potentiometer as part of a push-pull circuit in the amplifier. Furthermore, such potentiometer may be replaced by a variable reactance device in an alternating-current system. By way of example, FIG. 3 illustrates an alternating-current system generally analogous to the arrangement of FIG. 1. Control windings for the tacho-generators B and $G^1$ and the motor G are shown at $B^2$, $G^7$ and $G^8$ respectively, connected across a common alternating current course. The arrangements of FIGS. 2 and 3 will be clear without further description, and in these figures the same reference letters are used as in FIG. 1 for corresponding parts. In each of FIGS. 1 to 3 and in further figures, the broken line $G^4$ serves to indicate that the output shaft $G^3$ of the motor G is rigid with the input shaft $G^2$ to the tacho-generator $G^1$. An alternative electrical embodiment is shown in FIG. 3A. In this embodiment the tacho-generator B of FIGS. 1 to 3 is replaced by a rate demand potentiometer P the setting of which determines the rate of rotation of motor G producing panning of the camera. As in the previous embodiments the potentiometer K coupled to the zoom actuating mechanism is effective to vary the transmission ratio between the potentiometer P and the motor G as a function of zoom setting so that for a given rate demand on potentiometer P the pan rate produced by motor G will be a function of zoom setting. As in the previous embodiments this ensures a substantially constant pan sensitivity irrespective of zoom setting.

FIG. 4 shows an arrangement wherein the variable transmission means is in the form of a variable speed gear the arrangement also employing purely mechanical transmissions between the panning control hand wheel A and the panning actuators. In this arrangement the zoom actuating wheel $L^2$ drives the zoom actuating mechanism directly through a rotary transmission shaft or cable $L^3$ and also acts to operate a worm Q driving gears $Q^1$ which in turn causes slide movement of an inclined rack element $Q^2$. $Q^2$ carries the intermediate part R of a variable speed gear of the well known type having two oppositely directed rotatable cones $R^1$, $R^2$ disposed side by side, so that the effective transmission ratio between the two cones $R^1$ and $R^2$ is dependent on the position of the intermediate part R slidable between them. The driving cone $R^1$ is driven directly by a panning hand wheel A through a rotary transmission shaft or cable $A^2$, while the driven cone $R^2$ drives the reduction gearing H through intermediate gearing $H^1$ to produce panning. With this arrangement, the sensitivity of the panning control is dependent on the position of the zoom control, and thus on the equivalent focal length of the objective as varied by zooming. The variable speed gearing is arranged to act to render the apparent sensitivity of the panning approximately constant as the equivalent focal length of the objective is altered.

In a still further arrangement of control device hydraulic transmission is employed as shown in FIG. 5, and the sensitivity adjustment means comprise a swash plate the angle of which can be varied in the well known manner. The swash plate is mechanically linked with the zoom control element to effect variation in the sensitivity of the panning control in accordance with the variation in the equivalent focal length of the objective.

Such an alternative arrangement employing hydraulic transmission is indicated diagrammatically in FIG. 5 and serves also to indicate an arrangement wherein the adjustment means associated with the panning transmission operates in steps instead of continuously, as for example if the potentiometer K of the arrangements previously described were replaced by a device for switching resistances. In the arrangement of FIG. 5, a pump S is operable under the control of the panning control element (not shown) itself to operate the pistons of a number of cylinders and pistons $S^2$, $S^3$, the cylinders $S^2$ being hydraulically connected in parallel and the pistons $S^3$ being mechanically linked to move together. Each cylinder $S^2$, except the first, has a by-pass passage $S^1$ connecting its inlet with the remote end of the cylinder on the side of the piston $S^3$ remote from the inlet. The piston assembly is mechanically linked with a member $H^2$ driving the pan actuators. The effective transmission ratio of this system is varied by cutting out of operation one or more of the cylinders $S^2$. Thus, the inlet to each cylinder $S^2$ (except the first), incorporates a switch-over valve T which is operated under the control of the zoom control element $L^2$. For this purpose, the zoom gearing L, $L^1$ drives intermediate gearing $L^3$ for a cam $T^1$ which is mechanically linked with each of the shut-off valves T so that, during zooming, such cam $T^1$ acts to operate the valves T one after another. Each valve T has two positions, in one of which its associated cylinder and piston $S^2$ and $S^3$ is rendered operative and in the other of which such cylinder and piston are rendered inoperative. In the first of such positions, the valve T connects the cylinder inlet to the pump S and the by-pass passage S¹ to the return pipe, whilst in the second of such positions, the valve blocks the pump flow and return and renders the cylinder S² inoperative by connecting its two ends together by means of the by-pass passage. In use of this arrangement, during zooming from a small equivalent focal length to a large equivalent focal length, the cam T driven by the zoom control L² acts to operate the valves T one after another so as to render inoperative an increasing number of the cylinders S², thereby to maintain the panning control of appropriate apparent sensitivity within the fairly wide limits acceptable.

I claim:
1. A television or motion picture camera system comprising in combination:
   a camera having a zoom objective providing a continuous variation of the focal length throughout a range,
   a driving unit coupled to the camera and arranged to provide directional movement of the camera,
   and a variable transmission means operating the driving unit in response to the operation of a demand unit,
   said transmission means including means sensitive to the magnification of the camera-objective combination for operating the driving unit at a transmission ratio which is a function of this magnification,
   whereby a substantially constant portion of the field of view within the camera is traversed for a given demand from the demand unit irrespective of the magnification of the camera-objective combination.

2. A system as claimed in claim 1, wherein the variable transmission means includes means sensitive to the focal length setting of the zoom objective, whereby a substantially constant portion of the field of view within the camera is traversed for a given demand from the demand unit irrespective of the zoom setting.

3. A system as claimed in claim 1, wherein the variable transmission means includes means for operating the driving unit in response to signals from the demand unit.

4. A system as claimed in claim 3, wherein the signals are electric signals.

5. A system as claimed in claim 1, wherein two driving units are respectively arranged to move the camera angularly in a vertical and in a horizontal plane to produce tilting and panning.

6. A system as claimed in claim 3, wherein the variable transmission means includes a variable output device, such as a variable impedance element for modifying the power input to the driving unit as a function of the magnification of the camera-objective combination.

7. A system as claimed in claim 6, wherein the variable output device comprises variable resistance means and is coupled to the zoom objective, whereby the power input to the driving unit is a function of the focal length setting of the zoom objective.

8. A system as claimed in claim 1, wherein the demand unit comprises a velocity sensitive device, the driving unit comprises a reversible motor which is coupled to a further velocity sensitive device, and the motor is driven from a source responsive to the difference between the outputs of the two velocity sensitive devices.

9. A system as claimed in claim 8, wherein each velocity sensitive device is a tachometer generator.

10. A system as claimed in claim 6, wherein the demand unit comprises a velocity sensitive device, the driving unit comprises a reversible motor which is coupled to a further velocity sensitive device, and the motor is driven from a source responsive to the difference between the outputs of the two velocity sensitive devices.

11. A system as claimed in claim 10, wherein the variable output device comprises means for modifying the signals from one or both velocity sensitive devices as a function of the magnification of the camera-objective combination, whereby the rotation rate of the motor for a given demand from the demand unit is a function of this magnification.

12. A system as claimed in claim 8, wherein the demand unit is an excited tachometer generator and the level of excitation is varied as a function of the magnification of the camera-objective combination, so that the rotation rate of the motor for a given demand from the demand unit is a function of this magnification.

13. A system as claimed in claim 1, wherein the demand unit comprises means producing a position dependent signal, the driving unit comprises a reversible motor which is coupled to a further means producing a position dependent signal, and a source responsive to the difference between the outputs of said two means producing the position dependent signals for driving said motor.

14. A system as claimed in claim 13, wherein at least one of said means producing the position depending signals comprises a potentiometer.

15. A system as claimed in claim 1, wherein the demand unit comprises a manually operable hand wheel mechanically coupled to the driving unit by way of a variable ratio gear box which is coupled to a zoom actuating mechanism to provide a transmission ratio which is a function of the focal length setting of the zoom objective.

16. A system as claimed in claim 15, wherein the variable ratio gear box comprises two cones which are oppositely mounted for rotation with their conical surfaces adjacent and parallel, and which cones are coupled respectively to the demand unit and to the driving unit, power being transmitted between the cones by means coupled to the zoom actuating mechanism and arranged to move along the length of the conical surfaces, to produce variable transmission.

17. A system as claimed in claim 1, wherein the transmission means includes means for hydraulically powering the driving unit by way of a fluid pressure device whose transmission ratio is varied as a function of the focal length setting of the zoom objective.

18. A system as claimed in claim 1 and further including a source controlled by the demand unit for producing pulses at a pulse repetition rate which is a function of the magnification of the camera-objective combination, and means for applying said pulses to said driving unit.

19. A system as claimed in claim 1, wherein the demand unit includes means for producing a variable output by varying the gain of a servo system.

References Cited
UNITED STATES PATENTS

| | | | |
|---|---|---|---|
| 2,456,317 | 12/1948 | Rabinow | 352—140X |
| 2,955,518 | 10/1960 | Perry | 350—187UX |
| 3,164,838 | 1/1965 | Heinrich | 352—243X |

FOREIGN PATENTS

| | | | |
|---|---|---|---|
| 1,080,011 | 8/1967 | Great Britain | 350—187 |

JOHN M. HORAN, Primary Examiner

M. H. HAYES, Assistant Examiner

U.S. Cl. X.R.

350—85, 187; 352—140